(12) United States Patent
Koivuranta

(10) Patent No.: US 11,320,519 B2
(45) Date of Patent: May 3, 2022

(54) METHOD AND SYSTEM FOR PROCESSING LIDAR DATA

(71) Applicant: Sharper Shape Oy, Espoo (FI)

(72) Inventor: Ville Koivuranta, Kaarina (FI)

(73) Assignee: Sharper Shape Oy, Espoo (FI)

( * ) Notice: Subject to any disclaimer, the term of this patent is extended or adjusted under 35 U.S.C. 154(b) by 0 days.

(21) Appl. No.: 16/995,365

(22) Filed: Aug. 17, 2020

(65) Prior Publication Data

US 2022/0050179 A1    Feb. 17, 2022

(51) Int. Cl.
     *G01S 7/48*          (2006.01)
     *G01S 17/87*        (2020.01)
     *G01S 7/497*        (2006.01)

(52) U.S. Cl.
CPC .......... *G01S 7/4808* (2013.01); *G01S 7/4802* (2013.01); *G01S 7/4972* (2013.01); *G01S 17/87* (2013.01)

(58) Field of Classification Search
CPC .... G01S 7/4808; G01S 7/4802; G01S 7/4972; G01S 17/87
See application file for complete search history.

(56) References Cited

U.S. PATENT DOCUMENTS

| | | | |
|---|---|---|---|
| 2019/0004177 A1* | 1/2019 | Shand | G01S 7/484 |
| 2020/0333439 A1* | 10/2020 | Mahajan | G01S 17/931 |

* cited by examiner

*Primary Examiner* — Bryan Bui
(74) *Attorney, Agent, or Firm* — Ziegler IP Law Group, LLC

(57) ABSTRACT

A method including: obtaining first LiDAR dataset and second LiDAR dataset of environment from LiDAR database, first LiDAR dataset and second LiDAR dataset being captured at first time period and second time period, respectively, second time period being later than first time period; dividing first and second LiDAR datasets into first and second LiDAR subsets; matching given first LiDAR subset with given second LiDAR subset; detecting first objects and second objects in given first and second LiDAR subsets; determining average offset between locations of first objects and locations of second objects; creating given link between given first object and at least one second object, said second object lying within predefined threshold distance from given first object in direction of average offset; and evaluating validity of given link, based upon whether or not given link satisfies growth criterion, given first object is associated with at most one valid link.

20 Claims, 4 Drawing Sheets

METHOD AND SYSTEM FOR PROCESSING LIDAR DATA

TECHNICAL FIELD

The present disclosure relates generally to processing of LiDAR data; and more specifically, to methods for processing LiDAR data. Moreover, the present disclosure also relates to systems for processing LiDAR data.

BACKGROUND

Over the past decade, Light Detection and Ranging (LiDAR) technology has gained popularity for several applications (for example, such as surveying, forestry, archeology, seismology, and the like). Nowadays, LiDAR technology is widely being used for manned or unmanned aerial surveying. In such a case, aerial vehicles (for example, helicopters, drones, and the like) are equipped with LiDAR systems that are to be used for the aerial surveillance. The LiDAR technology is not limited to providing only comprehensive geospatial images of an environment, and can be utilized for detecting changes, wherein even small changes in the environment can be detected. Such changes can be identified using successive LiDAR scans of the environment.

However, existing techniques for processing LiDAR data have several problems associated therewith. Firstly, the existing techniques are inefficient and inaccurate in terms of correctly identifying a same object represented in different LiDAR data that has been captured at different times. For example, a conventional technique of classifying point cloud data to several classes does not alone meet the requirements for correctly identifying the same object in the different LiDAR data, and also creates a huge amount of data in a single dataset. Processing the huge amount of data is computationally intensive and time consuming. Secondly, existing techniques are not well-suited for object detection, given the manner in which the LiDAR data is typically collected. As an example, an aerial vehicle employed for surveying may take different routes for capturing the different LiDAR data. The different LiDAR data in this case may be slightly offset. Moreover, heights of the different route can also be different. In this case, the same object is represented from different perspectives in the different LiDAR data (for example, a single tree may be visible from first perspective but may be behind another tree in a second perspective). Furthermore, point clouds obtained by the LiDAR systems are fairly sparse, so very limited data is available per object. Thirdly, a single LiDAR scan performed for important real-world applications (for example, such as vegetation management around utility infrastructures) generates a large volume of LiDAR data (for example, of the order of several terabytes). Based on analysis of said LiDAR data, costly actions may be initiated. As existing techniques for processing the LiDAR data are unreliable and inefficient, frequent LiDAR scans and costly actions are generally initiated on a regular basis. This increases business costs and inconvenience for entities involved in such real-world applications.

Therefore, in light of the foregoing discussion, there exists a need to overcome the aforementioned drawbacks associated with existing techniques for processing LiDAR data.

SUMMARY

The present disclosure seeks to provide a method for processing LiDAR data. The present disclosure also seeks to provide a system for processing LiDAR data. The present disclosure seeks to provide a solution to the existing problems of incorrectly identifying same objects represented in different LiDAR data, inefficient object detection, and low reliability of existing techniques for analyzing and processing LiDAR data. An aim of the present disclosure is to provide a solution that overcomes at least partially the problems encountered in prior art, and provides a method for analysing and processing LiDAR data that is efficient, accurate, and reliable in terms of object identification, establishing object co-relation and enabling efficient use of LiDAR data for real-world applications.

In one aspect, an embodiment of the present disclosure provides a method comprising:
   obtaining a first Light Detection and Ranging (LiDAR) dataset and a second LiDAR dataset of an environment from a LiDAR database, wherein the first LiDAR dataset has been captured at a first time period and the second LiDAR dataset has been captured at a second time period, the second time period being later than the first time period;
   dividing the first LiDAR dataset and the second LiDAR dataset into a plurality of first LiDAR subsets and a plurality of second LiDAR subsets, respectively;
   matching a given first LiDAR subset with a given second LiDAR subset;
   detecting a plurality of first objects and a plurality of second objects in the given first LiDAR subset and the given second LiDAR subset, respectively;
   determining an average offset between locations of the plurality of first objects and locations of the plurality of second objects;
   creating a given link between a given first object from amongst the plurality of first objects and at least one second object from amongst the plurality of second objects, the at least one second object lying within a predefined threshold distance from the given first object in a direction of the average offset; and
   evaluating validity of the given link, based upon whether or not the given link satisfies a growth criterion, wherein the given first object is associated with at most one valid link.

In another aspect, an embodiment of the present disclosure provides a system comprising a data processing arrangement, wherein the data processing arrangement is configured to:
   obtain a first Light Detection and Ranging (LiDAR) dataset and a second LiDAR dataset of an environment from a LiDAR database, wherein the first LiDAR dataset has been captured at a first time period and the second LiDAR dataset has been captured at a second time period, the second time period being later than the first time period;
   divide the first LiDAR dataset and the second LiDAR dataset into a plurality of first LiDAR subsets and a plurality of second LiDAR subsets, respectively;
   match a given first LiDAR subset with a given second LiDAR subset;
   detect a plurality of first objects and a plurality of second objects in the given first LiDAR subset and the given second LiDAR subset, respectively;
   determine an average offset between locations of the plurality of first objects and locations of the plurality of second objects;
   create a given link between a given first object from amongst the plurality of first objects and at least one second object from amongst the plurality of second objects, the at least one second object lying within a predefined threshold distance from the given first object in a direction of the average offset; and evaluate validity of the given link, based upon whether or not the given link satisfies a growth criterion, wherein the given first object is associated with at most one valid link.

Embodiments of the present disclosure substantially eliminate or at least partially address the aforementioned problems in the prior art, and enable efficient, accurate, and reliable analysis and processing of LiDAR data.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1A:
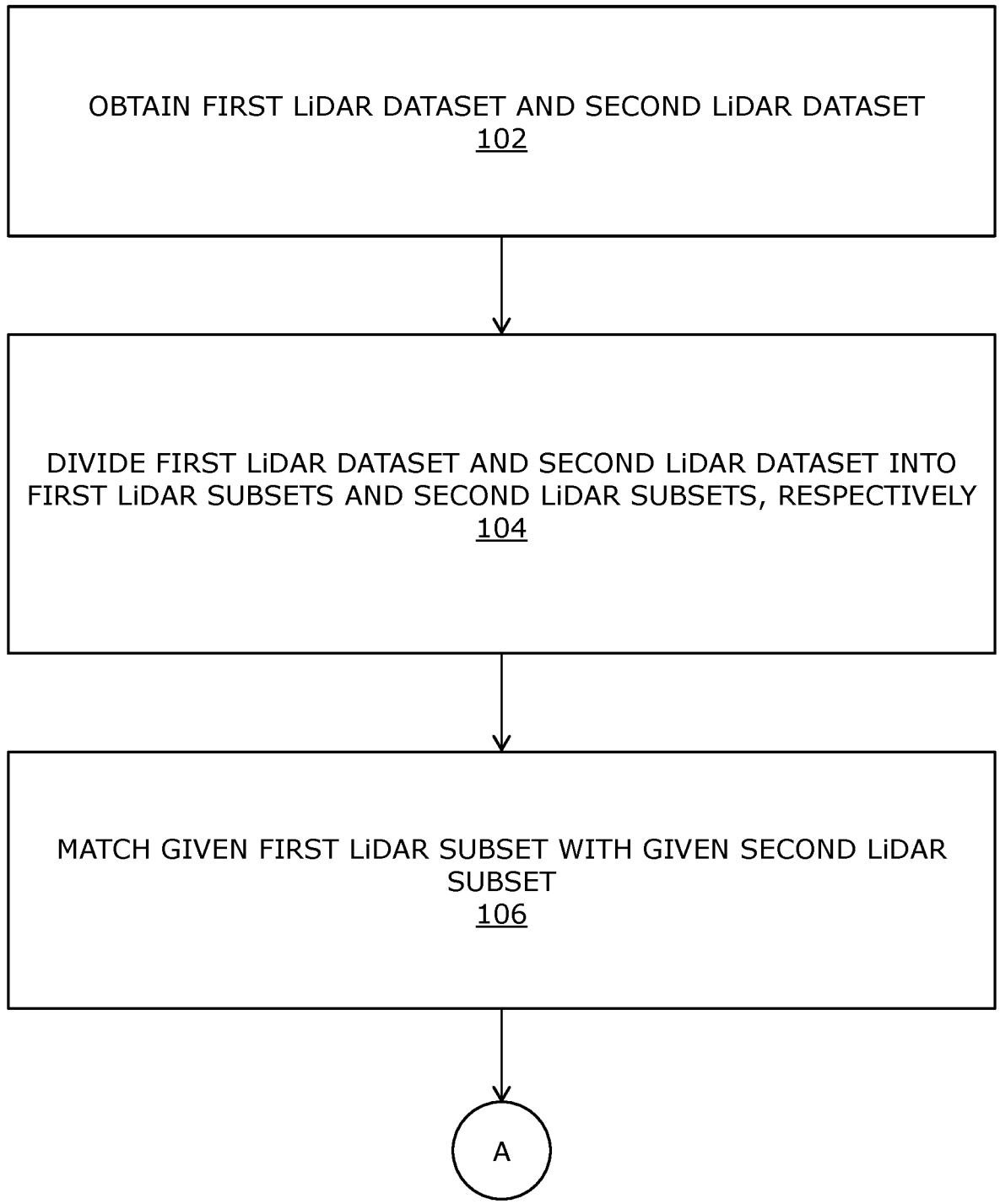
FIGS. 1A and 1B illustrate steps of a method, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method comprising:

obtaining a first Light Detection and Ranging (LiDAR) dataset and a second LiDAR dataset of an environment from a LiDAR database, wherein the first LiDAR dataset has been captured at a first time period and the second LiDAR dataset has been captured at a second time period, the second time period being later than the first time period;

dividing the first LiDAR dataset and the second LiDAR dataset into a plurality of first LiDAR subsets and a plurality of second LiDAR subsets, respectively;

matching a given first LiDAR subset with a given second LiDAR subset;

detecting a plurality of first objects and a plurality of second objects in the given first LiDAR subset and the given second LiDAR subset, respectively;

determining an average offset between locations of the plurality of first objects and locations of the plurality of second objects;

creating a given link between a given first object from amongst the plurality of first objects and at least one second object from amongst the plurality of second objects, the at least one second object lying within a predefined threshold distance from the given first object in a direction of the average offset; and evaluating validity of the given link, based upon whether or not the given link satisfies a growth criterion, wherein the given first object is associated with at most one valid link.

In another aspect, an embodiment of the present disclosure provides a system comprising a data processing arrangement, wherein the data processing arrangement is configured to:

obtain a first Light Detection and Ranging (LiDAR) dataset and a second LiDAR dataset of an environment from a LiDAR database, wherein the first LiDAR dataset has been captured at a first time period and the second LiDAR dataset has been captured at a second time period, the second time period being later than the first time period;

divide the first LiDAR dataset and the second LiDAR dataset into a plurality of first LiDAR subsets and a plurality of second LiDAR subsets, respectively;

match a given first LiDAR subset with a given second LiDAR subset;

detect a plurality of first objects and a plurality of second objects in the given first LiDAR subset and the given second LiDAR subset, respectively;

determine an average offset between locations of the plurality of first objects and locations of the plurality of second objects;

create a given link between a given first object from amongst the plurality of first objects and at least one second object from amongst the plurality of second objects, the at least one second object lying within a predefined threshold distance from the given first object in a direction of the average offset; and evaluate validity of the given link, based upon whether or not the given link satisfies a growth criterion, wherein the given first object is associated with at most one valid link.

The present disclosure provides the aforementioned method and the aforementioned system for processing LiDAR data. Herein, the plurality of first LiDAR subsets and the plurality of second LiDAR subsets are processed parallelly by the data processing arrangement. Such parallel processing is computationally simple and time efficient. Moreover, the plurality of first LiDAR subsets are matched with the plurality of second LiDAR subsets in a manner that a given first LiDAR subset is accurately aligned with corresponding given second LiDAR subset irrespective of how LiDAR datasets are typically captured. This facilitates minimizing or eliminating offsets between same objects in different LiDAR subsets when the different LiDAR subsets are compared. The method is well-suited for object detection as the LiDAR datasets are captured from relatively low altitude. This facilitates in obtaining highly accurate and dense point clouds that include considerable data available per object. In such a case, the method enables accurate object detection within LiDAR subsets and provides an efficient and accurate identification of a same object represented in different LiDAR subsets when comparing the different LiDAR subsets. The method provides an accurate and useful object-based technique for analysis and further use of LiDAR data. Beneficially, the method enables accurate analysis of the LiDAR data for important real-world applications (for example, such as vegetation management around utility infrastructures). This facilitates saving time and costs involved with such real-world applications. The system is reliable and can be implemented and used easily.

Throughout the present disclosure, the term "LiDAR dataset" refers to a collection of data captured by a LiDAR system. Optionally, the LiDAR system (for example, such as a LiDAR laser scanner) is embedded on an unmanned aerial vehicle that is employed for capturing a given LiDAR dataset of the environment. Optionally, a given unmanned aerial vehicle is implemented as a drone, a helicopter, and the like. Optionally, the given LiDAR dataset comprises a plurality of data points. Optionally, when the given unmanned aerial vehicle is implemented as the helicopter, a large volume of data points are generated in the given LiDAR dataset. The plurality of data points represent objects (such as, buildings, vegetation, and the like) on and above a ground surface in a three-dimensional space of the environment. Optionally, location of a given data point is expressed as (x, y, z) coordinates along X, Y, and Z axes, respectively of a given coordinate system employed for the environment. Optionally, the plurality of data points is collectively referred to as point clouds.

Optionally, a time duration between the first time period (of capturing the first LiDAR dataset) and the second time period (of capturing the second LiDAR dataset) is N months or N years. In an example, "N" may be equal to 1, 2, 3, 4, 5, and so on. In an example, a first LiDAR dataset may be captured in year 2015, and a second LiDAR dataset may be captured in year 2020. Herein, the time duration between the first time period and the second time period is 5 years.

It will be appreciated that the first LiDAR dataset and the second LiDAR dataset are captured at different times to enable comparison between the first LiDAR dataset and the second LiDAR dataset. Optionally, during such comparison, the environment for which the first LiDAR dataset and the second LiDAR dataset are captured is analyzed for the time duration between the first time period and the second time period.

It will also be appreciated that the process of capturing the LiDAR dataset is time-consuming and would take several days or weeks in a given time period depending upon a total geographical area of the environment for which the LiDAR dataset is to be captured. It will also be appreciated that when the LiDAR system scans the environment from a lower altitude, a large number of the plurality of data points are accurately captured. This facilitates accurate detection of the objects on and above the ground surface of the environment.

Throughout the present disclosure, the term "LiDAR database" refers to a systematic collection of information pertaining to LiDAR datasets. Optionally, the LiDAR database is stored at a data repository. Herein, the term "data repository" refers to hardware, software, firmware, or a combination of these for storing a given information in an organized (namely, structured) manner, thereby, allowing for easy storage, access (namely, retrieval), updating and analysis of the given information.

Optionally, a number of the plurality of first LiDAR subsets is equal to a number of the plurality of second LiDAR subsets. In such a case, one first LiDAR subset would correspond to one second LiDAR subset. In an example, number of first LiDAR subsets and number of second LiDAR subsets may be equal to three.

Optionally, a geographical area of a given LiDAR subset lies in a range of 100 square meters to 1000 square meters. For example, the geographical area of a given LiDAR subset may be from 100, 200, 300, 400, 500, 600, 700, 800 or 900 square meters to 200, 300, 400, 500, 600, 700, 800, 900 or 1000 square meters. It will be appreciated that the given LiDAR dataset is divided into the plurality of LiDAR subsets having a plurality of geographical areas. In an example, there may be a given LiDAR dataset for a total geographical area of 5500 square meters. The given LiDAR dataset may be divided into six LiDAR subsets A1, A2, A3, A4, A5, and A6. Herein, the geographical area of each of the LiDAR subsets A1-A5 may be 1000 square meters, and the geographical area of the LiDAR subset A6 may be 500 square meters.

Typically, when capturing a given LiDAR dataset of the environment, errors are induced in the given LiDAR dataset. This is attributed to the fact that the unmanned aerial vehicle employed for capturing the given LiDAR dataset has a long flight trajectory. Moreover, processing of the given LiDAR dataset generally requires considerable time and computational resources. This can be attributed to the fact that the given LiDAR dataset comprises data for a large geographical area of the environment.

Pursuant to embodiments of the present disclosure, the given LiDAR dataset is divided into two or more LiDAR subsets. It will be appreciated that when the given LiDAR dataset is divided into the two or more LiDAR subsets, the aforesaid errors (that occur typically) are decreased or eliminated. This can be attributed to the fact that a given LiDAR subset comprises data for a small geographical area of the environment. In such a case, the given LiDAR subset would be more linear as compared to the given LiDAR dataset and errors in the given LiDAR subset can easily be delineated using an offset. This facilitates faster subsequent processing of the given LiDAR subset and requires minimal computational resources as compared to the given LiDAR dataset.

Typically, the unmanned aerial vehicles employed for capturing the first LiDAR dataset and the second LiDAR dataset may take different routes at the first time period and the second time period, respectively. In such a case, the first LiDAR dataset is slightly offset from the second LiDAR dataset. In that case, location of a given first object in the first LiDAR dataset is offset from corresponding location of a given second object in the second LiDAR dataset. Moreover, heights of the different routes can also be different. In this case, the same object is represented from different perspectives in the first LiDAR dataset and the second LiDAR dataset (for example, a single object may be visible from first perspective but may be behind another object in a second perspective). In this regard, the first LiDAR dataset is misaligned with the second LiDAR dataset. However, matching the first LiDAR dataset with the second LiDAR dataset is generally complex, and thus requires considerable processing time.

Pursuant to embodiments of the present disclosure, the plurality of LiDAR subsets are considerably smaller than the given LiDAR dataset and such subsets could be processed parallelly. This facilitates ease in matching and requires less processing time for said matching and processing. Upon matching, the given first LiDAR subset is geometrically aligned with the corresponding given second LiDAR subset. Optionally, matching the given first LiDAR subset with the corresponding given second LiDAR subset is performed by orthorectification in a manner that offset between location of the given first object in the given first LiDAR subset and corresponding location of the given second object in the given second LiDAR subset is minimized. Optionally, the orthorectification is performed for both the given first LiDAR subset and the corresponding given second LiDAR subset. Herein, the term "orthorectification" refers to a process of eliminating optical distortions (for example, image perspective effects and relief (namely, terrain) effects, and the like) from a given LiDAR subset to make the given LiDAR subset planimetrically correct.

In an example, a first LiDAR dataset B may be divided into three first LiDAR subsets B1, B2, and B3. A second LiDAR dataset D may be divided into three second LiDAR subsets D1, D2, and D3. Herein, the first LiDAR subsets B1, B2, and B3 may be matched with the second LiDAR subsets D1, D2, and D3, respectively.

Optionally, the given first LiDAR subset is matched with the given second LiDAR subset to produce a given matched LiDAR subset. Herein, the term "matched LiDAR subset" refers to a LiDAR subset that would include both the plurality of first objects of the given first LiDAR subset and the plurality of second objects of the given second LiDAR subset. Optionally, the method further comprises storing, at the LiDAR database, the given matched LiDAR subset.

Optionally, the step of matching the given first LiDAR subset with the given second LiDAR subset is performed using a Bayesian LiDAR matching technique.

Optionally, in the method, the step of dividing the first LiDAR dataset and the second LiDAR dataset and/or the step of matching the given first LiDAR subset with the given second LiDAR subset are performed based on at least one of:
  an identification of ground control points and/or stationary objects in the environment and locations of the ground control points and/or stationary objects;
  locations at which flight trajectories of unmanned aerial vehicles employed to capture the first LiDAR dataset and the second LiDAR dataset intersect.

Optionally, the ground control points and/or the stationary objects in the environment are identified in the first LiDAR dataset and the second LiDAR dataset. Notably, these ground control points and/or the stationary objects are clearly identifiable and have fixed coordinates in the environment irrespective of time period of capturing a given LiDAR dataset. It will be appreciated that such fixed coordinates are accurately known for the first LiDAR dataset and the second LiDAR dataset. Therefore, optionally, the first LiDAR dataset and the second LiDAR dataset can be easily and accurately divided, based on the locations of the ground control points and/or the stationary objects, as the ground control points and/or the stationary objects serve as a reliable frame of reference for such division. Examples of the ground control points and/or the stationary objects include, but are not limited to, buildings, elements of a utility infrastructure (for example, such as powerlines of a power distribution infrastructure, poles of a power distribution infrastructure), and positioning beacons.

Moreover, optionally, the given first LiDAR subset is matched with the given second LiDAR subset, based on the locations of the ground control points and/or stationary objects, as the ground control points and/or the stationary objects serve as a reliable frame of reference for such matching. Optionally, in this regard, ground control points and/or stationary objects in the given first LiDAR subset are matched with corresponding ground control points and/or stationary objects in the given second LiDAR subset. Optionally, the ground control points and/or the stationary objects are used in the orthorectification process to augment geometric parameters embedded in a given LiDAR subset and improve accuracy of the given LiDAR subset upon orthorectification.

Optionally, the flight trajectories of the unmanned aerial vehicles employed to capture the first LiDAR dataset and the second LiDAR dataset are compared to identify the locations which said flight trajectories intersect. Optionally, the locations of intersection of the flight trajectories of unmanned aerial vehicles are identified in the first LiDAR dataset and the second LiDAR dataset as the coordinates that are common to the flight trajectories. It will be appreciated that, optionally, the locations of intersection of the flight trajectories of unmanned aerial vehicles can be accurately utilized in absence of the ground control points and/or the stationary objects.

Optionally, the given LiDAR subset corresponds to the geographical area lying between at least one of: ground control points and/or stationary objects, intersecting locations of the flight trajectories of the unmanned aerial vehicles employed to capture the first LiDAR dataset and the second LiDAR dataset. Optionally, at least one edge of the given LiDAR subset and/or at least one corner of the given LiDAR subset lies on at least one of: ground control points and/or stationary objects, intersecting locations of the flight trajectories of the unmanned aerial vehicles employed to capture the first LiDAR dataset and the second LiDAR dataset.

Optionally, the plurality of first objects and the plurality of second objects are detected by employing at least one object detection algorithm. Optionally, the at least one object detection algorithm comprises at least one of: a waterfall method, a classification algorithm, an edge detection algorithm, a pattern recognition algorithm. Optionally, detected objects are of different types. It will be appreciated that a given object is optionally at least one of: a tree, a building, an element of a utility infrastructure (for example, such as a powerline of a power distribution infrastructure, a pole of a power distribution infrastructure). Optionally, the at least one object detection algorithm is selected for detecting the given object, based on the type of the given object. In an example, the waterfall method is selected to detect peak of a tree when the given object is a tree.

Notably, the given object is capable to grow over a duration of time period between the first time period and the second time period. It will be appreciated that the growth of the given object could be a natural growth or a man-made growth.

Optionally, location of the given object in a given LiDAR subset is detected from a peak (namely, a topmost point or a top surface) of the given object. Optionally, the at least one object detection algorithm is employed to detect the peak of the given object in point cloud of the given LiDAR subset in order to detect the location of the given object. Optionally, when the given object has multiple peaks, the given object is identified by detecting a surface of the given object. This prevents the given object having multiple peaks to be detected as multiple objects. In an example, the detected object may be a banyan tree having multiple peaks. In such a case, the banyan tree is identified by detecting a trunk of the banyan tree.

It will be appreciated that optionally prior to detecting the given object, a ground surface (upon which the given object lies) is detected. It will also be appreciated that the step of matching the given first LiDAR subset with the given second LiDAR subset and the step of detecting the plurality of first objects and the plurality of second objects in the given first LiDAR subset and the given second LiDAR subset, respectively can be performed in any order.

Optionally, in the method, the step of determining the average offset comprises:
creating a plurality of temporary links between the plurality of first objects and the plurality of second objects, wherein a given temporary link extends between a given first object and a given second object that is taller than and closest to the given first object;
determining a magnitude and a direction of an offset indicated by each of the plurality of temporary links; and
averaging magnitudes and directions of offsets indicated by the plurality of temporary links.

It will be appreciated that for a given first object in a given matched LiDAR subset, there may exist one or more second objects that are in proximity to the given first object. The one or more second objects may have equal or unequal heights. In such a case, the given temporary link extends between the given first object and the given second object that is selected amongst the one or more second objects. Optionally, the plurality of temporary links are only created for a purpose of determining the average offset. It will be appreciated that as the given first LiDAR subset is matched with the given second LiDAR subset, the given second object in the given matched LiDAR subset that is closest to the given first object highly likely corresponds to the given first object. Moreover, as the given first object is capable of growing between the first time period and the second time period, the second object corresponding is selected to be one that is taller in height than the given first object.

In an example, there may be a given matched LiDAR subset having one first object F, and three second objects G1, G2, and G3 in proximity of the first object F. Herein, the second object G2 is taller than and closest to the first object F. In such a case, the temporary link may extend between the first object F and the second object G2.

Optionally, the magnitude and the direction of the offset is determined based on a location of the given first object associated with the given temporary link and a location of the given second object associated with the given temporary link. Optionally, a magnitude and a direction of the average offset is determined by averaging the magnitudes and the directions of offsets indicated by the plurality of temporary links. It will be appreciated that magnitude of the average offset is a mean value of offset for the given matched LiDAR subset, and direction of the average offset is a mean direction of offset for the given matched LiDAR subset.

Optionally, the step of determining the average offset employs at least one mathematical formula.

In an example, there may be a given matched LiDAR subset having three first objects H1, H2, and H3, and three second objects I1, I2, and I3. Herein, a temporary link J1 may extend between the first object H1 and the second object I1, a temporary link J2 may extend between the first object H2 and the second object I2, and a temporary link J3 may extend between the first object H3 and the second object I3. The temporary link J1 may indicate 1 meter offset towards a north direction, the temporary link J2 may indicate 2 meters offset towards a north-east direction, and the temporary link J3 may indicate 1.5 meter offset towards a north-east direction. Herein, for the given matched LiDAR subset, an average offset may be 1.5 meters (as $(1+2+1.5)/3$ equals 1.5) towards a north-east direction.

Optionally, the method further comprises determining a standard deviation of the average offset. Optionally, in this regard, there is employed at least one mathematical formula.

It will be appreciated that the step of creating the given link between the given first object and the at least one second object is performed for associating the given first object with the at least one second object. These links are different from the temporary links described above.

Optionally, there exists at least one first object that is not linked with any second object from amongst the plurality of second objects. Moreover, optionally, there exists at least one second object that is not linked with any first object from amongst the plurality of first objects. Optionally, in this regard, the at least one second object is a new object that was not present (namely, has not grown) at the first time period of capturing the first LiDAR dataset.

Optionally, the predefined threshold distance equals three standard deviations of the average offset. In this regard, when an offset between the given first object and the at least one second object is less than or equal to three standard deviations of the average offset in the direction of the average offset, the given link is created between the given first object and the at least one second object.

It will be appreciated that the predefined threshold distance optionally lies in a range of 2 standard deviations of the average offset to 4 standard deviations of the average offset. The three-sigma rule of thumb is useful for both a normal distribution, as well as a non-normal distribution of the average offset. It will be appreciated that when three standard deviations of the average offset are utilized for the normal distribution, 99.8 percent of the plurality of first objects and the plurality of second objects could be associated with links. Optionally, when the three standard deviations of the average offset are utilized for the non-normal distribution, by Chebyshev's inequality, 88.8% of the plurality of first objects and the plurality of second objects could be associated with links. Optionally, when the three standard deviations of the average offset are utilized for a unimodal distribution, by Vysochanskij-Petunin inequality, 95% of the plurality of first objects and the plurality of second objects could be associated with links.

It will be appreciated that not all links created between first objects amongst the plurality of first objects and second objects amongst the plurality of second objects are valid. Therefore, validity of such links is evaluated based upon whether or not the given link satisfies the growth criterion. Said evaluation is performed to retain only valid links within the given matched LiDAR subset. When the given link satisfies the growth criterion, the given link is a valid link. Alternatively, when the given link does not satisfy the growth criterion, the given link is an invalid link. Notably, the valid link indicates a relation between an object in the first LiDAR dataset and a corresponding object in the second LiDAR dataset. In such a case, a same object can be mapped across the first LiDAR dataset and the second LiDAR dataset. It will be appreciated that, in this regard, a plurality of LiDAR datasets that are captured over different time periods can be optimally combined by making association between same objects in the plurality of LiDAR datasets. This optionally facilitates an accurate analysis of characteristics that are associated with the objects.

Notably, the given first object is associated with at most one valid link as there would only be a single given second object corresponding to the given first object, and thus the given first object and the given second object are linked only to each other to form the valid link.

Optionally, in the method, the given link satisfies the growth criterion when:
 a height of the at least one second object is greater than a height of the given first object, and
 a difference in the height of the at least one second object and the height of the given first object is lesser than or equal to a growth threshold for the environment, wherein a time period between the second time period and the first time period is N years and the growth threshold is N times a sum of an average growth rate and N times a standard deviation of the average growth rate.

Optionally, when the given link satisfies the growth criterion, it indicates that: the given first object associated with the given link grows in the time period between the second time period and the first time period to a height equal to that of the at least second object associated with the given link, and growth of the given first object in the time period of N years is a reasonable growth (as said growth is lesser than or equal to the growth threshold for the environment). Herein, the "growth threshold" for the environment is an upper limit of growth (namely, a maximum possible growth) for objects in the environment.

In an example, the height of the given first object associated with the given link may be 55 meters at the first time period, and the height of the second object associated with the given link may be 60 meters at the second time period. There may be a time period of 3 years between the second time period and the first time period. When the difference in the height of the second object and the height of the first object is less than or equal to 3 times a sum of the average growth rate (for example, 2 meters per year) and 3 times the standard deviation (for example, 0.5) of the average growth rate, the given link is a valid link as the given link satisfies the growth criterion. Alternatively, had the height of the second object been, for example, 70 meters, the given link would have been determined to be invalid.

Optionally, when the given first object has a plurality of links with a plurality of second objects, the validity of the plurality of links is evaluated, based on proximity of the plurality of second objects to the given first object. In particular, validity of the link corresponding to a closest second object (amongst the plurality of second objects) to the given first object is evaluated. When the link corresponding to the closest second object is invalid, then validity of another link corresponding to a next closest object amongst the plurality of links is evaluated, and so on.

Optionally, the method further comprises determining a given second object in the given second LiDAR subset to be a shadow when:
 a height of the given second object is smaller than a height of a given first object with which the given second object is linked; or
 a difference between the height of the given second object and the height of the given first object is greater than a growth threshold for the environment, a time period between the second time period and the first time period being N years, wherein the growth threshold is N times a sum of an average growth rate and N times a standard deviation of the average growth rate.

Optionally, the step of determining the given second object in the given second LiDAR subset to be a shadow is performed for second objects that do not have a valid link with any first object. In such a case, the shadow of the given second object partially blocks a view of other second objects in the given second LiDAR subset. Optionally, the shadow is generated due to at least one of: an opening window of the LiDAR system, obstacles (namely, occlusion) between the LiDAR system and objects. The opening window of the LiDAR system directly affects an angle at which the LiDAR system captures LiDAR data, and said angle may cause shadows to be captured in said LiDAR data.

In an example, the height of the given first object may be 45 meters, and the height of the second object linked to the given first object may be 40 meters. Herein, the given second object is determined to be a shadow as its height is smaller than the height of the given first object.

In another example, the difference between the height of the given second object and the height of the given first object may be 15 meters, which is greater than a growth threshold of 12 meters for the environment. In such a case, the given second object is determined to be a shadow. The growth threshold may be calculated for a 4 year time period between the second time period and the first time period, given the average growth rate of 2 meters per year and the standard deviation equal to 0.25.

Optionally, a cluster of second objects in the given second LiDAR subset is determined to be a cluster of shadows. Optionally, in this regard, the second objects of the cluster in the given second LiDAR subset are approximately of same height. Optionally, the shadows are recognized based on clustering algorithms. Optionally, a radius of clustering employed in the clustering algorithms is adjustable. It will be appreciated that shadows or clusters of shadows are required to be identified as they may cause difficulty or inability in detecting genuine second objects (that are not shadows) corresponding to first objects.

Optionally, when an object in a given second LiDAR subset is not linked to any corresponding first object, it is determined to be a new object that has grown in the time period between the second time period and the time first period. In such a case, the new object would not be associated with any link. The new object would become a first object in the second LiDAR subset, and would be matched with a corresponding second object in a third LiDAR subset.

Optionally, the method further comprises:
 identifying a first object that is not linked with any second object from amongst the plurality of second objects;
 obtaining a first digital surface model of the first LiDAR subset and a second digital surface model of the second LiDAR subset; and
 comparing an average height of a region in a proximity of the identified first object in the first digital surface model with an average height of a corresponding region in the second digital surface model to evaluate whether or not the identified first object has fallen or been removed.

It will be appreciated that when there exists the first object that is not linked with any second object, there is required further analysis to ascertain what happened to the first object in the time duration between the first time period and the second time period. The first digital surface model and the second digital surface model are employed for such analysis. Optionally, when the average height of the region in proximity (namely, a buffered region) of the identified first object in the first digital surface model is higher than the average height of the corresponding region in the second digital surface model, the identified first object is considered to be either fallen or removed. A decrease in the average height of a same region over time (such as between the first time period and the second time period) indicates that object(s) in that region have either fallen (for example, due to natural causes or man-made causes) or have been removed.

Herein, the term "digital surface model" refers to a three-dimensional representation of a surface of the environment and objects (such as, buildings, trees, and the like) on the surface of the environment.

Optionally, the region in proximity of the identified first object is up to 5 meters from a location of the identified first object. In an example, the region in proximity of the identified first object may be 3 meters from the location of the identified first object.

Optionally, the method further comprises removing invalid links that do not satisfy the growth criterion. In this case, the given matched LiDAR subset would be updated (namely, optimized) to include only valid links.

Optionally, in this regard, the method further comprises:
combining, upon updating, a plurality of matched LiDAR subsets into an updated LiDAR dataset of the environment; and
storing, at the LiDAR database of the environment, the updated LiDAR dataset.

Optionally, the plurality of second objects comprises a plurality of trees, the method further comprises:
obtaining information pertaining to a power distribution infrastructure in the environment;
determining, based on the second LiDAR dataset, vegetation data for the plurality of trees, wherein the vegetation data comprises heights of the plurality of trees and locations of the plurality of trees within the environment;
determining distances of the plurality of trees from the power distribution infrastructure, based on the locations of the plurality of trees and the information pertaining to the power distribution infrastructure; and
identifying, from amongst the plurality of trees, risky trees that are required to be removed, wherein a given tree is identified as a risky tree when:
a height of the given tree is equal to or greater than a Pythagorean sum of a distance of the given tree from the power distribution infrastructure and a height of the power distribution infrastructure in a proximity of the given tree, or
a sum of the height of the given tree and a growth threshold for the environment within a time period N between the second time period and a next time period in which a next LiDAR dataset is to be captured is equal to or greater than the Pythagorean sum, wherein the growth threshold is equal to N times a sum of an average growth rate in the environment and N times a standard deviation of the average growth rate, or
the height of the given tree has not changed from a previous height of the given tree as represented in a previous LiDAR dataset captured in a previous time period.

Optionally, in this regard, the plurality of first objects comprises a plurality of trees.

Herein, the term "power distribution infrastructure" refers to utility infrastructure for delivering electric power within and/or through the environment. Optionally, the electric power is delivered via poles and powerlines of the power distribution infrastructure.

Optionally, the information pertaining to the power distribution infrastructure comprises at least one of: a digital surface model of the environment, a number of poles in the power distribution infrastructure, types of the poles, heights of the poles, locations of the poles, powerline hanging parameters. Optionally, said information is obtained from the data repository. Optionally, said information is obtained from unmanned aerial vehicles employed for capturing said information. Optionally, in the powerline hanging parameters, thermal expansion of the powerlines is taken into account to ascertain minimum heights of the poles in the power distribution infrastructure.

It will be appreciated that the information pertaining to the power distribution infrastructure enables the power distribution infrastructure to be modeled as an object-based system for the power distribution operators to use the captured first and second LiDAR datasets efficiently. The power distribution infrastructure is unique from a LiDAR scanning point of view, as it comprises a large amount of precise point clouds and enables an object-based LIDAR dataset analysis.

Optionally, the information pertaining to the power distribution infrastructure is employed to plan the flight trajectories of the unmanned aerial vehicles. In this way, the LiDAR system mounted on the unmanned aerial vehicles captures, by way of the LiDAR dataset, information of vegetation that surrounds the power distribution infrastructure.

Herein, the term "vegetation data" refers to information pertaining to the plurality of trees within the environment. Optionally, the vegetation data further comprises at least one of: average growth rate of the plurality of trees, standard deviation of the average growth rate of the plurality of trees, species information for the plurality of trees. Optionally, the vegetation data for the plurality of trees is determined based on the updated LiDAR dataset of the environment. Technical benefits arising out of utilizing the updated LiDAR dataset are high accuracy and low processing time in determining the vegetation data for the plurality of trees as information pertaining to the plurality of trees is already known and accurately known in the updated LiDAR dataset.

Optionally, the step of determining the distances between the plurality of trees and the power distribution infrastructure employs at least one mathematical formula. Optionally, the distance of the given tree from the power distribution infrastructure is determined based on location of the given tree and location of the poles and/or hanging powerlines of the power distribution infrastructure.

Throughout the present disclosure, the term "risky tree" refers to a tree that is likely to fall onto the power distribution infrastructure (such as, the poles and/or the hanging powerlines in the power distribution infrastructure) in proximity of said tree. If any tree falls onto the power distribution infrastructure, it could lead to disruption in delivering electric power and/or could cause fire due to a circuit break. In this regard, it is of critical importance that such risky trees are identified and timely removed or trimmed in order to prevent damage of the power distribution infrastructure. Operation of the power distribution infrastructure is required to be maintained reliably. Optionally, digitally identifying the risky trees enables efficient vegetation management whilst ensuring that operation of the power distribution infrastructure is maintained. This facilitates reduction in cost of vegetation management, better vegetation management planning, and the like.

Optionally, when the height of the given tree is equal to or greater than the Pythagorean sum of the distance of the given tree from the power distribution infrastructure and the height of the power distribution infrastructure in the proximity of the given tree, it indicates that the given tree has grown to such a height that the given tree can fall onto the power distribution infrastructure in its proximity.

Optionally, when the sum of the height of the given tree and the growth threshold for the environment within the time period N between the second time period and the next time period in which the next LiDAR dataset is to be captured is equal to or greater than the Pythagorean sum, it indicates that the given tree would become a risky tree in future (for example, after the time period N). This can be attributed to the fact that after the time period N, the height of the given tree would increase (as the given tree grows) by a factor of the growth threshold for the environment, and when said height would be equal to or greater than the Pythagorean sum, the given tree could fall onto the power distribution infrastructure in its proximity.

Optionally, when the height of the given tree has not changed from the previous height of the given tree as represented in the previous LiDAR dataset captured in a previous time period, it indicates that the given tree has not grown at all within the time duration between given time period and the previous time period. This indicates that the given tree is dead or dying, therefore prone to falling onto the power distribution infrastructure in its proximity.

Optionally, the method further comprises detecting species of the plurality of trees, based on at least one of: the average growth rate in the environment, hyperspectral data of the environment.

Optionally, the species of the plurality of trees are detected based on the average growth rate in the environment. It will be appreciated that the average growth rate in the environment depends on type of species of the plurality of trees present in the environment and growth rate of individual species. Some species of trees (such as, eucalyptus) may have a higher growth rate, while other species of trees (such as, white cedar) may have a lower growth rate. It will be appreciated that the average growth rate in the environment may also vary according to soil, rainfall, temperature, humidity, and the like, in the environment.

Optionally, growth rate for a given species of tree is predefined. Optionally, a given species of trees in the environment are detected when the average growth rate in the environment lies within a predefined threshold of the predefined growth rate for the given species of trees. In an example, species of the trees in the environment may be detected as eucalyptus when the average growth rate in the environment (for example, 1.8 meters per year) lies within the predefined threshold (for example, (+/−) 20 percent) of the predefined growth rate (for example, 2 meters per year) for eucalyptus.

Additionally or alternatively, optionally, the species of the plurality of trees are detected based on the hyperspectral data of the environment. Herein, the term "hyperspectral data" refers to information of electromagnetic spectrum for each pixel in a hyperspectral image of the environment. Optionally, the hyperspectral image is captured by a hyperspectral camera that is arranged on an unmanned aerial vehicle. Optionally, the hyperspectral image comprises spatial information (namely, image features) and spectral information (namely, spectral-bands) of the environment. Different species of trees reflect different amount of radiation in different regions of the electromagnetic spectrum. Optionally, detecting the species of the plurality of trees comprises: determining spectral signatures of each pixel representing the plurality of trees, in hyperspectral data of the environment; and analyzing the spectral signatures to classify the plurality of trees into one or more species.

Optionally, the method further comprises:
  generating a predictive growth model for the plurality of trees, based on the detected species of the plurality of trees and differences in heights of second objects and heights of first objects associated with valid links therebetween; and
  estimating, based on the predictive growth model and the distances of the plurality of trees from the power distribution infrastructure, a future time instant at which a given tree would become a risky tree.

Herein, the term "predictive growth model" refers to a model that predicts growth of the plurality of trees. In some implementations, a single predictive growth model is generated to predict growth of the plurality of trees, whereas in other implementations individual predictive growth models are generated to predict growth of individual trees. In an example, the predictive growth model may indicate a growth rate of 1 meter per year for the plurality of trees. It will be appreciated that geological factors (such as soil, rainfall, temperature, humidity, and the like) can also be used for generating the predictive growth model.

Optionally, the differences in the heights of second objects and the heights of first objects associated with the valid links therebetween are indicative of the average growth rate of objects. In such a case, growth of an object in the environment can be predicted based on the average growth rate of objects. When the first objects and the second objects are trees, average growth rate of trees is determined in this way. Then, the predictive growth model is generated based at least on the average growth rate of trees, since the average growth rate of trees (which is determined based on how the trees have grown in the past) indicates how the trees can grow in future.

Additionally, optionally, when the detected species of the plurality of trees are known, growth rate of species of the plurality of trees is also known. In such a case, growth of a given tree in the environment can be predicted based growth rate of species of the given tree. Then, the predictive growth model is generated based at least on the growth rate of species of the trees, since the growth rate of species of the trees indicates how the trees belonging to a particular species can grow in future.

Optionally, the future time instant at which the given tree would become the risky tree is determined by: subtracting a height of the given tree at the second time period from the Pythagorean sum of the distance of the given tree from the power distribution infrastructure and the height of the power distribution infrastructure in the proximity of the given tree; and dividing the difference obtained upon subtracting by the growth rate of the given tree. In an example, the Pythagorean sum may be 10 meters, the height of the given tree at the second time period may be 7 meters, and the growth rate of the given tree by the predictive growth model of the given tree may be 1 meter per year. In such a case, the future time instant at which the given tree would become the risky tree may be 3 years (as (10−7)/1 equals 3) from the second time period.

In some instances, the predictive growth model and location of the given tree amongst the plurality of trees may be such that the given tree would never become the risky tree in the future. In an example, locations of some trees may be close to the power distribution infrastructure, but their predictive growth models may indicate that these trees grow in a manner (for example, extremely slowly) that they would not become risky trees in the future. In another example, locations of some trees may be so far from the power distribution infrastructure that irrespective of their growth indicated by the predictive growth model, these trees would not become risky trees in future.

Optionally, the method further comprises determining a frequency of capturing a LiDAR dataset of the environment, based on the predictive growth model for the plurality of trees.

Notably, both capturing the LiDAR datasets of the environment and removing the risky trees are costly operations, and thus frequency of these operations needs to be minimized to save cost. However, the frequency of these operations needs to be sufficient enough to avoid damage to the power distribution infrastructure. When the predictive growth model for the plurality of trees is utilized to estimate the future time instant at which the given tree would become the risky tree, the frequency of capturing the LiDAR dataset of the environment can be adjusted according to the future time instant. The predictive growth model is beneficially utilized to predict a future need for capturing a next LiDAR dataset of the environment. Optionally, a next time period for capturing the next LiDAR dataset of the environment is determined to either precede and/or succeed the future time instant at which the given tree would become the risky tree. In an example, the future time instant at which the given tree would become the risky tree may be 5 years, and the next time period for capturing the next LiDAR dataset of the environment may be after 4 years.

It will be appreciated that when the next LiDAR dataset of the environment is captured before the future time instant, predictions of risky trees at the future time instant can be verified. It will also be appreciated that when the next LiDAR dataset of the environment is captured after the future time instant, it can be checked whether or not the risky trees have been removed or trimmed. As an example, trees in the first LiDAR dataset may be linked with corresponding trees in the second LiDAR dataset, and trees likely to become risky trees at the future time instant may be identified in the LiDAR second dataset. When a third LiDAR dataset is captured at a third time period that is later than the future time instant, such risky trees should not be present or should appear to be trimmed in the third LiDAR dataset. This indicates that potential damage to the power distribution infrastructure has been prevented by undertaking proper vegetation management.

It will be appreciated that the frequency of capturing the LiDAR dataset of the environment is optimized, based on the predictive growth model for the plurality of trees. This facilitates capturing the LiDAR dataset to areas where fresh information is required and therefore, allocating the LiDAR systems to capture information of those areas. It will also be appreciated that the predictive growth models are beneficial to predict a future need for vegetation management.

Optionally, the method further comprises determining a frequency of capturing LiDAR datasets of regions of the environment, based on the predictive growth model for the plurality of trees. Optionally, when different regions of the environment have different species of the trees, the future time instant at which a given tree would become a risky tree is different for different regions. In this regard, the frequency of capturing the LiDAR datasets of different regions of the environment may be different.

Optionally, the method further comprises creating a preventive vegetation clearance plan, based at least on locations of the identified risky trees. Optionally, creation of the preventive vegetation clearance plan, is based also on locations of trees that are likely to become risky trees in future, and future times at which said trees are likely to become risky trees.

Optionally, creation of the preventive vegetation clearance plan comprises determining a route for vegetation clearance, based on the locations of the identified risky trees and/or the locations of trees that are likely to become risky trees in the future. Optionally, creation of the preventive vegetation clearance plan further comprises estimating which route for the vegetation clearance to follow at which time instant. Herein, the term "vegetation clearance plan" refers to a plan for removal (namely, clearance) or trimming of trees that are identified as risky trees and/or are likely to become risky trees. Optionally, in the vegetation clearance plan, a vegetation management team (for example, such as lumberjacks, vegetation management personnel, and the like) is employed to remove or trim the trees that are identified as the risky trees and/or are likely to become the risky trees.

Optionally, in this regard, the method further comprises enabling the vegetation management team to:
  assess severity of the trees that are identified as the risky trees and/or are likely to become the risky trees; and
  prepare a statistical summary comprising an average size of the risky trees to be cut, a maximum height of branches of the risky trees that needs cutting, a suitable vegetation management technique or equipment.

Optionally, the vegetation management technique or equipment is deployed for removing or trimming the trees that are identified as the risky trees and/or are likely to become the risky trees. Examples for such technique or equipment may include, but are not limited to, a manual technique, a forestry equipment, a branch trimming technique (by means of helicopter).

It will be appreciated that optionally automatic analysis of LIDAR datasets and vegetation management planning enables creation of automatic vegetation management plans that take into consideration logistic issues and severity of each individual tree that is close to the power distribution infrastructure. Moreover, optionally, it enables a new kind of vegetation management, wherein field actions of the vegetation management team are accurately planned beforehand and executed with help of a solution that targets and documents work of the vegetation management team with utmost accuracy. Such an automatic vegetation management planning solution uses precise locations of each individual risky tree, and creates logistically optimized plans for vegetation management using said locations. It will also be appreciated that the method provides understandable vegetation data metrics based on LiDAR datasets. Moreover, since the method enables object-based analysis of LiDAR data, benefits of targeted and optimized vegetation management arise from weighting different observations with severity and estimated costs of power outage, and cost of vegetation management work. Said benefits are unavailable using the conventional methods that enable area-based analysis.

The aforesaid system implements the steps of the method. Throughout the present disclosure, the term "data processing arrangement" refers to hardware, software, firmware, or a combination of these, for performing specialized data processing tasks of the method. Optionally, the data processing arrangement comprises a plurality of processors for parallel processing of the plurality of first LiDAR subsets and the plurality of second LiDAR subsets.

Optionally, the data processing arrangement is communicably coupled to the data repository wirelessly and/or in a wired manner. Optionally, the data processing arrangement is communicably coupled to the data repository via a data communication network. It will be appreciated that the data communication network may be wired, wireless, or a combination thereof. Examples of the data communication network may include, but are not limited to, Internet, a local network (such as, a TCP/IP-based network, an Ethernet-based local area network, an Ethernet-based personal area network, a Wi-Fi network, and the like), Wide Area Networks (WANs), Metropolitan Area Networks (MANs), a telecommunication network, and a radio network.

Optionally, the data repository is implemented as at least one database server. Optionally, the LiDAR database (including the first LiDAR dataset and the second LiDAR dataset of the environment) is stored at the data repository. Optionally, the information pertaining to the power distribution infrastructure in the environment is stored at the data repository. Optionally, the data repository stores LiDAR databases of a plurality of environments, and information pertaining to utility infrastructures in the plurality of environments.

Optionally, the data repository is communicably coupled to the unmanned aerial vehicles employed for capturing the first LiDAR dataset and the second LiDAR dataset. Optionally, the data repository is communicably coupled to the unmanned aerial vehicles employed for capturing the information pertaining to the power distribution infrastructure in the environment. Optionally, the data repository is communicably coupled to a device (such as a computer) associated with the power distribution infrastructure.

The present disclosure also relates to the system as described above. Various embodiments and variants disclosed above, with respect to the aforementioned first aspect, apply mutatis mutandis to the system.

Optionally, the given link satisfies the growth criterion when:
  a height of the at least one second object is greater than a height of the given first object, and
  a difference in the height of the at least one second object and the height of the given first object is lesser than or equal to a growth threshold for the environment, wherein a time period between the second time period and the first time period is N years and the growth threshold is N times a sum of an average growth rate and N times a standard deviation of the average growth rate.

Optionally, the data processing arrangement is further configured to determine a given second object in the given second LiDAR subset to be a shadow when:
  a height of the given second object is smaller than a height of a given first object with which the given second object is linked; or
  a difference between the height of the given second object and the height of the given first object is greater than a growth threshold for the environment, a time period between the second time period and the first time period being N years, wherein the growth threshold is N times a sum of an average growth rate and N times a standard deviation of the average growth rate.

Optionally, the data processing arrangement is further configured to:
  identify a first object that is not linked with any second object from amongst the plurality of second objects;
  obtain a first digital surface model of the first LiDAR subset with a second digital surface model of the second LiDAR subset; and
  compare an average height of a region in a proximity of the identified first object in the first digital surface model with an average height of a corresponding region in the second digital surface model to evaluate whether or not the identified first object has fallen or been removed.

Optionally, the data processing arrangement is configured to divide the first LiDAR dataset and the second LiDAR dataset and/or match the given first LiDAR subset with the given second LiDAR subset based on at least one of:
  an identification of ground control points and/or stationary objects in the environment and locations of the ground control points and/or stationary objects;
  locations at which flight trajectories of unmanned aerial vehicles employed to capture the first LiDAR dataset and the second LiDAR dataset intersect.

Optionally, when determining the average offset, the data processing arrangement is configured to:
  create a plurality of temporary links between the plurality of first objects and the plurality of second objects, wherein a given temporary link extends between a given first object and a given second object that is taller than and closest to the given first object;
  determine a magnitude and a direction of an offset indicated by each of the plurality of temporary links; and
  average magnitudes and directions of offsets indicated by the plurality of temporary links.

Optionally, when the plurality of second objects comprises a plurality of trees, the data processing arrangement is further configured to:
  obtain information pertaining to a power distribution infrastructure in the environment;
  determine, based on the second LiDAR dataset, vegetation data for the plurality of trees, wherein the vegetation data comprises heights of the plurality of trees and locations of the plurality of trees within the environment;
  determine distances of the plurality of trees from the power distribution infrastructure, based on the locations of the plurality of trees and the information pertaining to the power distribution infrastructure; and
  identify, from amongst the plurality of trees, risky trees that are required to be removed, wherein a given tree is identified as a risky tree when:
  a height of the given tree is equal to or greater than a Pythagorean sum of a distance of the given tree from the power distribution infrastructure and a height of the power distribution infrastructure in a proximity of the given tree, or
  a sum of the height of the given tree and a growth threshold for the environment within a time period N between the second time period and a next time period in which a next LiDAR dataset is to be captured is equal to or greater than the Pythagorean sum, wherein the growth threshold is equal to N times a sum of an average growth rate in the environment and N times a standard deviation of the average growth rate, or the height of the given tree has not changed from a previous height of the given tree as represented in a previous LiDAR dataset captured in a previous time period.

Optionally, the data processing arrangement is further configured to detect species of the plurality of trees, based on at least one of: the average growth rate in the environment, hyperspectral data of the environment.

Optionally, the data processing arrangement is configured to:

generate a predictive growth model for the plurality of trees, based on the detected species of the plurality of trees and differences in heights of second objects and heights of first objects associated with valid links therebetween; and estimate, based on the predictive growth model and the distances of the plurality of trees from the power distribution infrastructure, a future time instant at which a given tree would become a risky tree.

Optionally, the data processing arrangement is configured to determine a frequency of capturing a LiDAR dataset of the environment, based on the predictive growth model for the plurality of trees.

DETAILED DESCRIPTION OF THE DRAWINGS

Figure 1B:
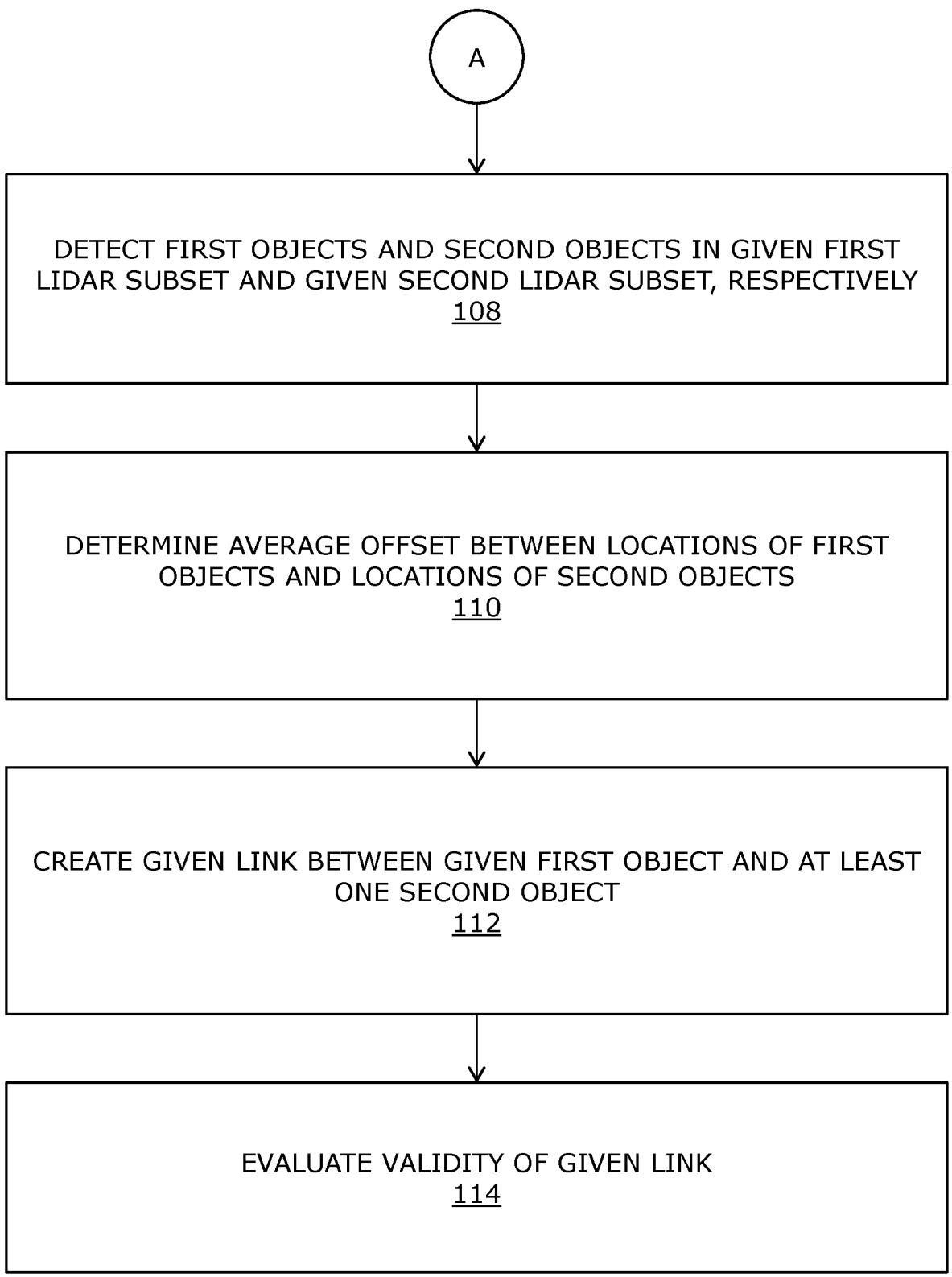

Referring to FIGS. 1A and 1B, illustrated are steps of a method, in accordance with an embodiment of the present disclosure. At step 102, a first Light Detection and Ranging (LiDAR) dataset and a second LiDAR dataset of an environment are obtained from a LiDAR database. The first LiDAR dataset has been captured at a first time period and the second LiDAR dataset has been captured at a second time period, the second time period being later than the first time period. At step 104, the first LiDAR dataset and the second LiDAR dataset are divided into a plurality of first LiDAR subsets and a plurality of second LiDAR subsets, respectively. At step 106, a given first LiDAR subset is matched with a given second LiDAR subset. At step 108, a plurality of first objects and a plurality of second objects are detected in the given first LiDAR subset and the given second LiDAR subset, respectively. At step 110, an average offset between locations of the plurality of first objects and locations of the plurality of second objects is determined. At step 112, a given link is created between a given first object from amongst the plurality of first objects and at least one second object from amongst the plurality of second objects. The at least one second object lies within a predefined threshold distance from the given first object in a direction of the average offset. At step 114, validity of the given link is evaluated, based upon whether or not the given link satisfies a growth criterion, wherein the given first object is associated with at most one valid link.

The steps 102, 104, 106, 108, 110, 112, and 114 are only illustrative and other alternatives can also be provided where one or more steps are added, one or more steps are removed, or one or more steps are provided in a different sequence without departing from the scope of the claims herein.

Figure 2:
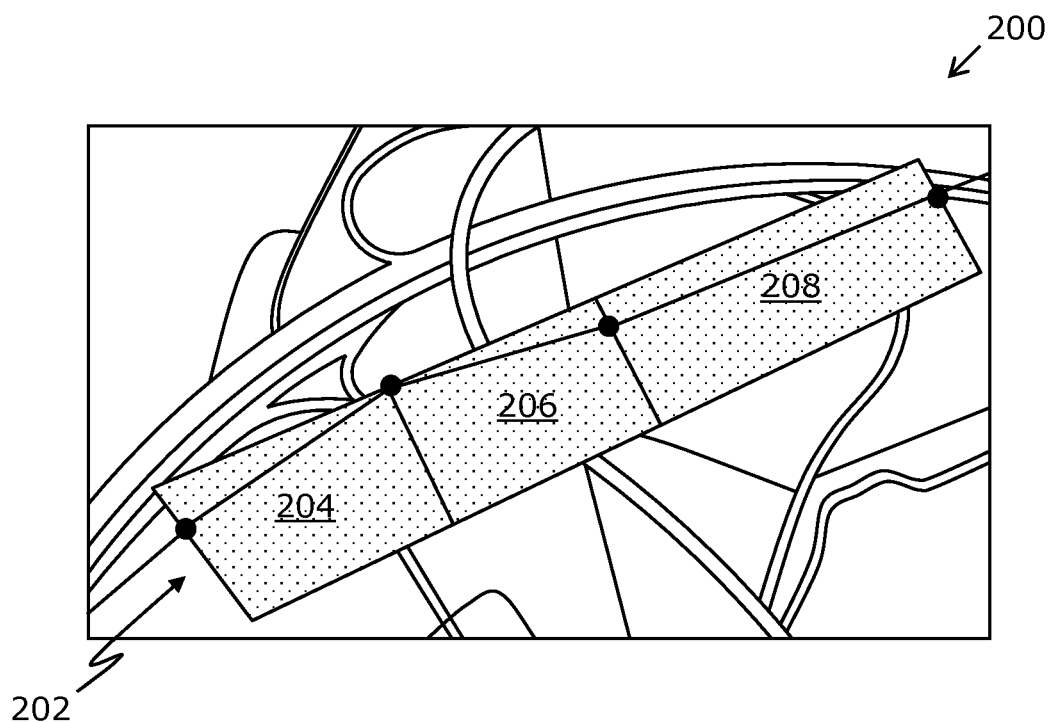
FIG. 2 illustrates an exemplary manner in which a given LiDAR dataset of an environment is divided, in accordance with an embodiment of the present disclosure.

Referring to FIG. 2, illustrated is an exemplary manner in which a given LiDAR dataset of an environment 200 is divided, in accordance with an embodiment of the present disclosure. The given LiDAR dataset corresponds to a region 202 (depicted as a dotted-hatched region) of the environment 200. The given LiDAR dataset is divided into three LiDAR subsets corresponding to three subregions 204, 206, and 208 of the region 202. The division of the given LiDAR dataset is performed based on identified ground control points and/or stationary objects (depicted as dots) in the environment 200 and locations of the ground control points and/or stationary objects. As an example, each of the LiDAR subsets lies between two ground control points and/or stationary objects.

Figure 3:
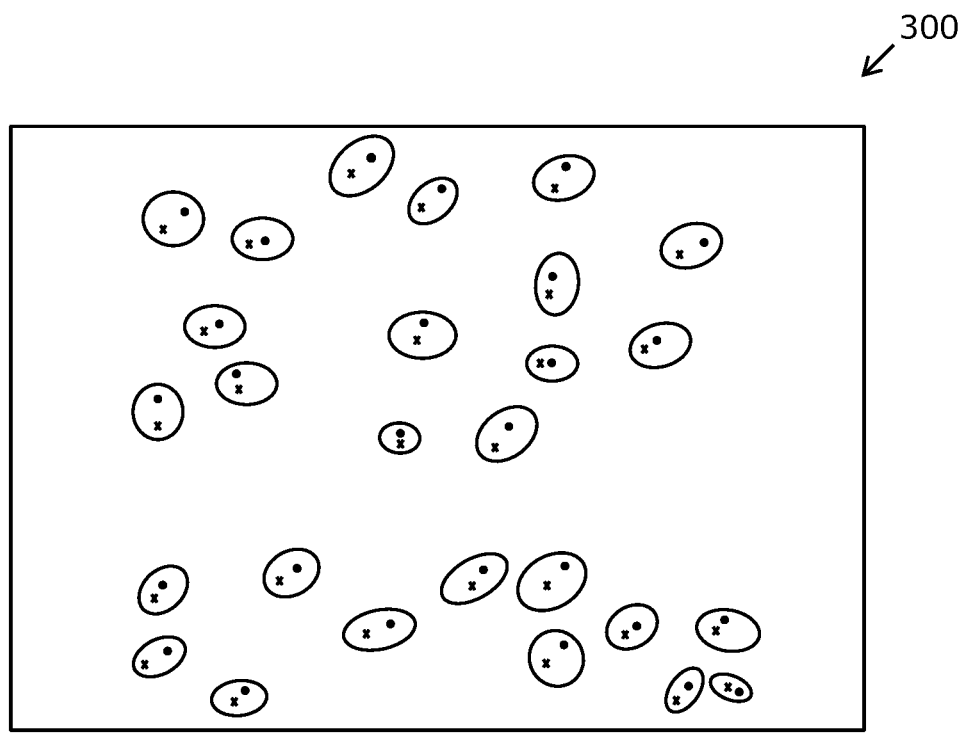
FIG. 3 illustrates an exemplary matched LiDAR subset, in accordance with an embodiment of the present disclosure.

Referring to FIG. 3, illustrated is an exemplary matched LiDAR subset 300, in accordance with an embodiment of the present disclosure. The matched LiDAR subset 300 is formed by matching a given first LiDAR subset (not shown) with a given second LiDAR subset (not shown). The matched LiDAR subset 300 includes detected first objects (depicted by crosses) and detected second objects (depicted by dots). There are also shown links (depicted as ellipses encircling linked pairs of first objects and second objects) between the first objects and the second objects. A given first object is linked to at least one second object that lies within a predefined threshold distance from the given first object in a direction of an average offset between locations of the first objects and locations of the second objects. A direction of the average offset is, for example, along a north-east direction.

Figure 4:
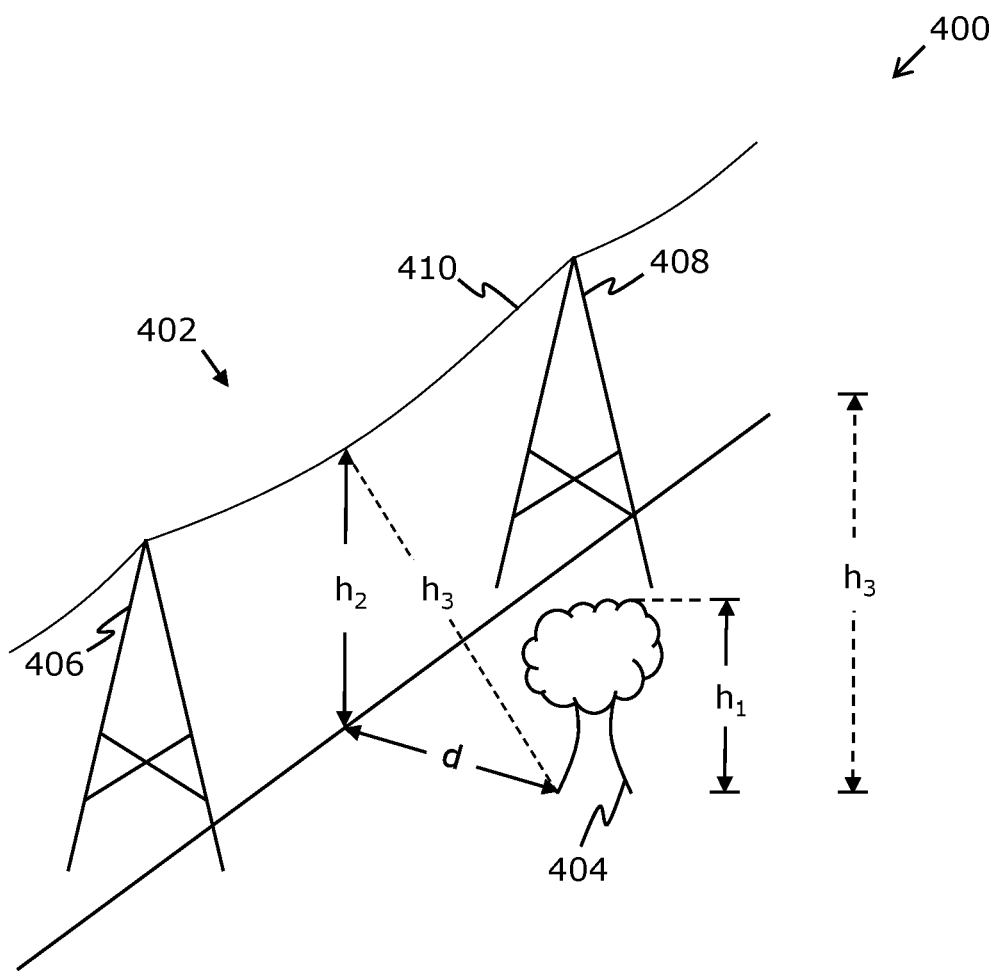
FIG. 4 is a schematic illustration of an environment including a power distribution infrastructure and a tree, in accordance with an embodiment of the present disclosure.

Referring to FIG. 4, illustrated is a schematic illustration of an environment 400 including a power distribution infrastructure 402 and a tree 404, in accordance with an embodiment of the present disclosure. The power distribution infrastructure 402 comprises a plurality of poles (depicted as poles 406 and 408) and a powerline 410. The environment 400 includes a plurality of trees. For sake of simplicity, there is shown a single tree 404 from amongst the plurality of trees. The tree 404 is in proximity of the powerline 410. The tree 404 would be identified as a risky tree when a height of the tree 404 is equal to or greater than a Pythagorean sum of a distance d of the tree 404 from the powerline 410 and the height h2 of the powerline in a proximity of the tree 404. When a current height h1 of the tree 404 does not satisfy the aforesaid criteria, the tree 404 is not currently identified as a risky tree. In future, when the tree 404 grows and its height becomes equal to or greater than h3, the tree would be identified as a risky tree as then the height of the tree 404 would be equal to or greater than the Pythagorean sum (as squared(h3) is equal to or greater than a sum of squared(h2) and squared(d)).

It may be understood by a person skilled in the art that the FIGS. 2, 3 and 4 are merely examples for sake of clarity, which should not unduly limit the scope of the claims herein. The person skilled in the art will recognize many variations, alternatives, and modifications of embodiments of the present disclosure.

Figure 5:
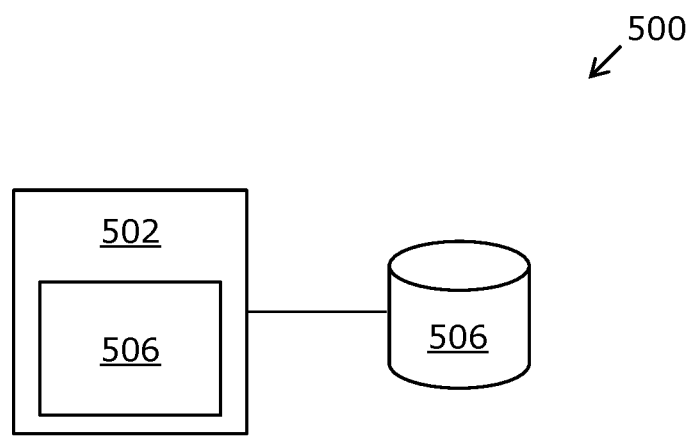
FIG. 5 is a schematic illustration of a system environment where a system is used, in accordance with an embodiment of the present disclosure.

Referring to FIG. 5, illustrated is a schematic illustration of a system environment 500 where a system 502 is used, in accordance with an embodiment of the present disclosure. The system 502 comprises a data processing arrangement 504. The system 502 is coupled in communication with a data repository 506. At least a Light Detection and Ranging (LiDAR) database is stored at the data repository 506.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method comprising:
    obtaining a first Light Detection and Ranging (LiDAR) dataset and a second LiDAR dataset of an environment from a LiDAR database, wherein the first LiDAR dataset has been captured at a first time period and the second LiDAR dataset has been captured at a second time period, the second time period being later than the first time period;
    dividing the first LiDAR dataset and the second LiDAR dataset into a plurality of first LiDAR subsets and a plurality of second LiDAR subsets, respectively;
    matching first LiDAR subset with a second LiDAR subset;
    detecting a plurality of first objects in the first LiDAR subset and a plurality of second objects in the subset second LiDAR subsets;
    determining an average offset between locations of the plurality of first objects and locations of the plurality of second objects;
    creating a link between a first object from the plurality of first objects and at least one second object from the plurality of second objects, the at least one second object lying within a predefined threshold distance from the first object in a direction of the average offset; and
    evaluating a validity of the link, based upon whether or not the link satisfies a growth criterion, wherein the first object is associated with at most one valid link.

2. The method according to claim 1, wherein the link satisfies the growth criterion when:
    a height of the at least one second object is greater than a height of the first object, and
    a difference in the height of the at least one second object and the height of the give first object is lesser than or equal to a growth threshold for the environment, wherein a time period between the second time period and the first time period is N years and the growth threshold is N times a sum of an average growth rate and N times a standard deviation of the average growth rate.

3. The method according to claim 1, further comprising determining a second object in the second LiDAR subset to be a shadow when:
    a height of the second object is smaller than a height of a first object with which the second object is linked; or
    a difference between the height of the second object and the height of the first object with which the second object is linked is greater than a growth threshold for the environment, a time period between the second time period and the first time period being N years, wherein the growth threshold is N times a sum of an average growth rate and N times a standard deviation of the average growth rate.

4. The method according to claim 1, further comprising:
    identifying a first object that is not linked with any second object from amongst the plurality of second objects;
    obtaining a first digital surface model of the first LiDAR subset and a second digital surface model of the second LiDAR subset; and
    comparing an average height of a region in a proximity of the identified first object in the first digital surface model with an average height of a corresponding region in the second digital surface model to evaluate whether or not the identified first object has fallen or been removed.

5. The method according to claim 1, wherein one or more of the step of dividing the first LiDAR dataset and the second LiDAR dataset and the step of matching the first LiDAR subset with the second LiDAR subset are performed based on at least one of:
    an identification of one or more of ground control points and stationary objects in the environment and one or more of locations of the ground control points and stationary objects;
    locations at which flight trajectories of unmanned aerial vehicles employed to capture the first LiDAR dataset and the second LiDAR dataset intersect.

6. The method according to claim 1, wherein the step of determining the average offset comprises:
    creating a plurality of temporary links between the plurality of first objects and the plurality of second objects, wherein a temporary link extends between the first object and a second object that is taller than and closest to the first object;
    determining a magnitude and a direction of an offset indicated by each of the plurality of temporary links; and
    averaging magnitudes and directions of offsets indicated by the plurality of temporary links.

7. The method according to claim 1, wherein the plurality of second objects comprises a plurality of trees, the method further comprising:
    obtaining information pertaining to a power distribution infrastructure in the environment;
    determining, based on the second LiDAR dataset, vegetation data for the plurality of trees, wherein the vegetation data comprises heights of the plurality of trees and locations of the plurality of trees within the environment;
    determining distances of the plurality of trees from the power distribution infrastructure, based on the locations of the plurality of trees and the information pertaining to the power distribution infrastructure; and
    identifying, from amongst the plurality of trees, risky trees that are required to be removed, wherein a tree is identified as a risky tree when:
        a height of the tree is equal to or greater than a Pythagorean sum of a distance of the tree from the power distribution infrastructure and a height of the power distribution infrastructure in a proximity of the tree, or
        a sum of the height of the tree and a growth threshold for the environment within a time period N between the second time period and a next time period in which a next LiDAR dataset is to be captured is equal to or greater than the Pythagorean sum, wherein the growth threshold is equal to N times a sum of an average growth rate in the environment and N times a standard deviation of the average growth rate, or
        the height of the tree has not changed from a previous height of the tree as represented in a previous LiDAR dataset captured in a previous time period.

8. The method according to claim 7, further comprising detecting a species of the plurality of trees, based on at least one of: the average growth rate in the environment and hyperspectral data of the environment.

9. The method according to claim 8, further comprising:
    generating a predictive growth model for the plurality of trees, based on the detected species of the plurality of trees and differences in heights of second objects and heights of first objects associated with valid links therebetween; and estimating, based on the predictive growth model and the distances of the plurality of trees from the power distribution infrastructure, a future time instant at which a tree would become a risky tree.

10. The method according to claim 9, further comprising determining a frequency of capturing a LiDAR dataset of the environment, based on the predictive growth model for the plurality of trees.

11. A system comprising a data processing arrangement, wherein the data processing arrangement is configured to:
obtain a first Light Detection and Ranging (LiDAR) dataset and a second LiDAR dataset of an environment from a LiDAR database, wherein the first LiDAR dataset has been captured at a first time period and the second LiDAR dataset has been captured at a second time period, the second time period being later than the first time period;
divide the first LiDAR dataset and the second LiDAR dataset into a plurality of first LiDAR subsets and a plurality of second LiDAR subsets, respectively;
match a first LiDAR subset with a second LiDAR subset;
detect a plurality of first objects in the first LiDAR subset and a plurality of second objects in the second LiDAR subset;
determine an average offset between locations of the plurality of first objects and locations of the plurality of second objects;
create a link between a first object from amongst the plurality of first objects and at least one second object from amongst the plurality of second objects, the at least one second object lying within a predefined threshold distance from the first object in a direction of the average offset; and
evaluate a validity of the link, based upon whether or not the link satisfies a growth criterion, wherein the first object is associated with at most one valid link.

12. The system of claim 11, wherein the link satisfies the growth criterion when:
a height of the at least one second object is greater than a height of the first object, and
a difference in the height of the at least one second object and the height of the first object is lesser than or equal to a growth threshold for the environment, wherein a time period between the second time period and the first time period is N years and the growth threshold is N times a sum of an average growth rate and N times a standard deviation of the average growth rate.

13. The system of claim 11, wherein the data processing arrangement is further configured to determine a second object in the second LiDAR subset to be a shadow when:
a height of the second object is smaller than a height of a first object with which the second object is linked; or
a difference between the height of the second object and the height of the first object with which the second object is linked is greater than a growth threshold for the environment, a time period between the second time period and the first time period being N years, wherein the growth threshold is N times a sum of an average growth rate and N times a standard deviation of the average growth rate.

14. The system of claim 11, wherein the data processing arrangement is further configured to:
identify a first object that is not linked with any second object from amongst the plurality of second objects;
obtain a first digital surface model of the first LiDAR subset with a second digital surface model of the second LiDAR subset; and
compare an average height of a region in a proximity of the identified first object in the first digital surface model with an average height of a corresponding region in the second digital surface model to evaluate whether or not the identified first object has fallen or been removed.

15. The system of claim 11, wherein the data processing arrangement is configured to one or more of divide the first LiDAR dataset and the second LiDAR dataset and match the given first LiDAR subset with the given second LiDAR subset based on at least one of:
an identification of one or more of ground control points and stationary objects in the environment and locations of one or more of the ground control points and stationary objects;
locations at which flight trajectories of unmanned aerial vehicles employed to capture the first LiDAR dataset and the second LiDAR dataset intersect.

16. The system of claim 11, wherein, when determining the average offset, the data processing arrangement is configured to:
create a plurality of temporary links between the plurality of first objects and the plurality of second objects, wherein a temporary link extends between the first object and a second object that is taller than and closest to the first object;
determine a magnitude and a direction of an offset indicated by each of the plurality of temporary links; and
average magnitudes and directions of offsets indicated by the plurality of temporary links.

17. The system of claim 11, wherein the plurality of second objects comprises a plurality of trees, and wherein the data processing arrangement is further configured to:
obtain information pertaining to a power distribution infrastructure in the environment;
determine, based on the second LiDAR dataset, vegetation data for the plurality of trees, wherein the vegetation data comprises heights of the plurality of trees and locations of the plurality of trees within the environment;
determine distances of the plurality of trees from the power distribution infrastructure, based on the locations of the plurality of trees and the information pertaining to the power distribution infrastructure; and
identify, from amongst the plurality of trees, risky trees that are required to be removed, wherein a tree is identified as a risky tree when:
a height of the tree is equal to or greater than a Pythagorean sum of a distance of the tree from the power distribution infrastructure and a height of the power distribution infrastructure in a proximity of the tree, or
a sum of the height of the tree and a growth threshold for the environment within a time period N between the second time period and a next time period in which a next LiDAR dataset is to be captured is equal to or greater than the Pythagorean sum, wherein the growth threshold is equal to N times a sum of an average growth rate in the environment and N times a standard deviation of the average growth rate, or
the height of the tree has not changed from a previous height of the tree as represented in a previous LiDAR dataset captured in a previous time period.

18. The system of claim 17, wherein the data processing arrangement is further configured to detect species of the plurality of trees, based on at least one of: the average growth rate in the environment and hyperspectral data of the environment.

19. The system of claim 18, wherein the data processing arrangement is configured to:
- generate a predictive growth model for the plurality of trees, based on the detected species of the plurality of trees and differences in heights of second objects and heights of first objects associated with valid links therebetween; and
- estimate, based on the predictive growth model and the distances of the plurality of trees from the power distribution infrastructure, a future time instant at which a tree would become a risky tree.

20. The system of claim 19, wherein the data processing arrangement is configured to determine a frequency of capturing a LiDAR dataset of the environment, based on the predictive growth model for the plurality of trees.

\* \* \* \* \*